United States Patent

Perlman et al.

[15] 3,683,211

[45] Aug. 8, 1972

[54] FERRO-ELECTRIC TRANSFORMERS WITH MEANS TO SUPRESS OR LIMIT RESONANT VIBRATIONS

[72] Inventors: Stuart Stanley Perlman; Joseph Henry McCusker, both of Princeton, N.J.

[73] Assignee: RCA Corporation

[22] Filed: April 1, 1971

[21] Appl. No.: 131,341

[52] U.S. Cl. ......................310/8.2, 310/8.3, 310/8.6, 310/8.7, 310/9.1, 310/9.8

[51] Int. Cl. ..........................................H01v 7/00

[58] Field of Search .....................310/8–8.7, 9.1–9.4, 310/9.8

[56] References Cited

UNITED STATES PATENTS

| | | | |
|---|---|---|---|
| 2,484,636 | 10/1949 | Mason | 310/8.2 X |
| 3,521,089 | 7/1970 | Stuetzer | 310/8.5 X |
| 3,299,711 | 1/1967 | Hatschek | 310/8.7 UX |
| 1,829,234 | 10/1931 | Nicolson | 310/8.5 |
| 3,174,122 | 3/1965 | Fowler et al. | 310/8.5 X |
| 3,004,424 | 10/1961 | Henry | 310/8.1 X |
| 3,363,139 | 1/1968 | Schiavone | 310/8.7 X |
| 3,509,389 | 4/1970 | Vrataric, Jr. | 310/8.5 X |

OTHER PUBLICATIONS

" An Adaptive Resonant Filter" Proceedings of the IEEE, Vol. 58, pp. 190- 197, Feb. 1970, by J. H. McCusker & S. S. Perlman.

" An Adaptive Ferroelectric Transformer--A Solid State Analog Memory Device" IEEE Transactions on Electronic Devices, Vol. Ed- 17, No. 7, July, 1970, by J. H. McCusker and S. S. Perlman.

*Primary Examiner*—J. D. Miller
*Assistant Examiner*—Mark O. Budd
*Attorney*—G. H. Bruestle

[57] ABSTRACT

Mechanically coupled ferroelectric capacitors are surface mounted on a rigid substrate so as to suppress resonant modes of vibration and to limit non-resonant modes of vibrations to those which result in the same polarity output signal. The mechanical vibrations caused in one capacitor (the input capacitor) by an input signal mechanically couples to the other capacitor (the output capacitor) and induces an output signal therein due to the piezoelectric properties of the dielectric. The structure is sandwich-like and consists of a first electrode, a ferroelectric body, a common electrode, a second ferroelectric body and a second electrode. The second electrode is preferably mounted on a rigid substrate.

5 Claims, 7 Drawing Figures

INVENTOR.
STUART S. PERLMAN &
JOSEPH H. MC CUSKER
BY Joel F. Spivak
ATTORNEY

INVENTOR.
STUART S. PERLMAN &
JOSEPH H. MC CUSKER
BY
ATTORNEY

INVENTORS
STUART S. PERLMAN &
JOSEPH H. MC CUSKER
BY [signature]
ATTORNEY

FERRO-ELECTRIC TRANSFORMERS WITH MEANS TO SUPRESS OR LIMIT RESONANT VIBRATIONS

BACKGROUND OF THE INVENTION

This invention relates to adaptive electronic devices and particularly to adaptive devices comprising a pair of mechanically coupled piezoelectric capacitors.

An adaptive electronic device is a circuit element whose transfer characteristic can be adjusted or set by an adapt or control signal and will retain that characteristic after the signal has been removed. These devices are useful as filters and transformers. The adaptive transformer is very similar in structure, operation and performance to the adaptive filter. An important difference between the filter and the transformer is that the transformer's response is flat over a broad frequency range, such as the entire audio frequency spectrum, while the filter's response is limited to narrow frequency regions centered about the mechanical resonant frequencies of the device structure. Consequently, adaptive transformers are potentially useful in most of the analog memory circuits suitable for resonant filters, as well as a variety of circuits where flat broad band frequency response is required, such as in the direct control of audio amplifier gain in remote control systems in commercial television or speech recognition equipment. In addition, the adaptive transformers are useful in control circuits for light dimmers.

The adaptive devices comprise a pair of mechanically coupled ceramic piezoelectric capacitors, at least one of which is ferroelectric. Both the ferroelectric and piezoelectric properties of the capacitor material are utilized in operation of the adaptive transformer.

A more detailed description and explanation of adaptive electronic devices can be found with reference to an article titled, "An Adaptive Resonant Filter," appearing in the proceedings of the IEEE, Vol. 58, pages 190–197, Feb. 1970 and an article titled, "An Adaptive Ferroelectric Transformer—A Solid State Analog Memory Device," appearing in IEEE Transactions on Electronic Devices, Vol. Ed–17, No. 7, July 1970. Both of the aforementioned articles are authored by J. H. McCusker and S. S. Perlman, the present inventors. As taught in the latter article, the adaptive transformer is completely potted in a rigid substance in order to enhance non-resonant response and to reduce resonant response by helping to suppress resonant modes of mechanical vibration. This teaching is included in the claimed invention of this application.

A basic difference between the adaptive resonant filter and the adaptive transformer is that in the transformer, resonant modes of vibration in the input capacitor are suppressed and non-resonant modes of vibration in the input capacitor are preferably limited to those modes having net components of mechanical stress in the same direction. If these components of stress were in opposite directions, the effect would be to cancel each other, either directly in the input capacitor or at the output capacitor, due to the generation of output signals having opposite polarity.

A typical three-terminal adaptive ferroelectric transformer comprises two mechanically bonded parallel plate capacitors having a common plate as one electrical contact for the capacitors. The dielectric material of the capacitor is a ceramic composition such as lead zirconate/lead titanate having both piezoelectric and ferroelectric properties. One capacitor functions as the input capacitor and the other capacitor functions as the output capacitor of the transformer. The transfer characteristic, i.e., gain ($V_{out}/V_{in}$) versus frequency, is flat over a number of decades of frequency which is determined by the size of the structure. For example, a 6.5 × 6.5 mm device has a characteristic that is flat over the entire audio frequency spectrum. The gain of the characteristic can be set to any arbitrary value between typical values of −60 dB to −20 dB by the application of an appropriate adapt pulse to either its input or output ferroelectric capacitor. The aforementioned article teaches that unless the transformer structure is completely potted in a rigid substance, the maximum attainable gain is substantially reduced. A problem, however, exists due to the relatively poor temperature stability characteristics of the potted device, often leading to the necessity of temperature compensating circuits.

Since the date of our publication, we have discovered an improved device structure which leads to adaptive ferroelectric transformers having good temperature stability characteristics.

SUMMARY OF THE INVENTION

An adaptive electronic device comprises a pair of mechanically coupled piezoelectric capacitors, at least one of which possesses ferroelectric properties, and means coupled therewith to limit non-resonant vibrations of said device essentially to those that yield the same polarity output signals.

DETAILED DESCRIPTION OF THE PREFERRED EMBODIMENTS

Figure 1:
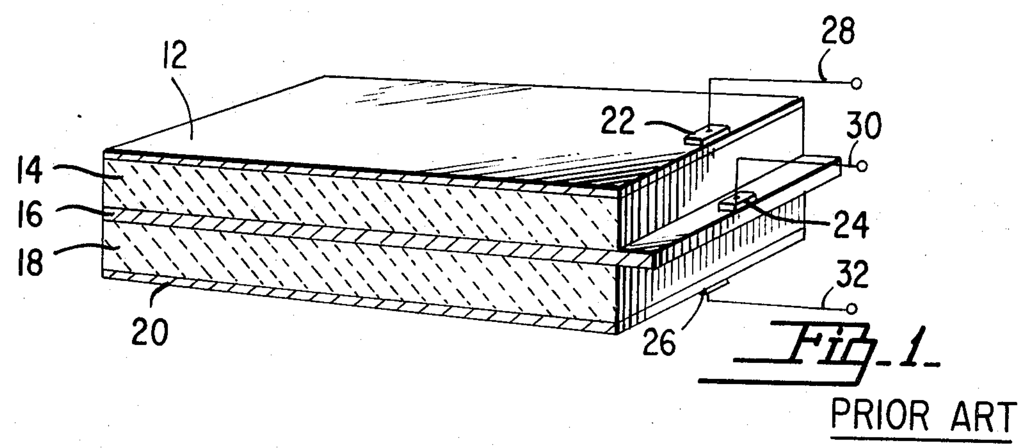
FIG. 1 PRIOR ART
FIG. 1 is a perspective partially cross-sectional view of an unmounted prior art adaptive ferroelectric transformer.

Referring to FIG. 1 there is shown a prior art unencapsulated and unmounted adaptive ferroelectric device. The device is a sandwich-type structure comprising a first metal contact 12, a first body 14 of ferroelectric material, a common conductor contact 16, a second body 18 of ferroelectric material, which may be of the same composition as the first body 14 of ferroelectric material, and a second metal contact 20.

This structure provides two capacitors which are mechanically coupled to each other. The first capacitor comprises the first metal contact 12, the first ferroelectric body 14 and the common conductor 16. The second capacitor comprises the second metal contact 20, the second ferroelectric body 18 and the common conductor 16. Typical dimensions of the adaptive ferroelectric device are 250 mils × 250 mils × 20 mils thick. Typical thickness of the ferroelectric bodies or layers is approximately 7 mils. The common conductor 16 is shown to extend beyond the ferroelectric bodies in order to allow for easy attachment of conductive leads to the common conductor 16. Each of the conductors 12, 16 and 20 is provided with conductor lead pads 22, 24 and 26 and wire leads 28, 30, and 32 respectively.

The ferroelectric materials suitable for this device are not limited to lead zirconate/lead titanate materials. Any ferroelectric material is suitable. For example, materials such as ferroelectric barium titanate and lithium niobate may also be employed, however, the characteristics of the device will change in accordance with the piezoelectric and ferroelectric properties of the materials used. Also, the aforementioned device dimensions are not critical with respect to temperature stability and a wide variety of dimensions may be employed. This unclamped device is not suitable for use as a transformer since flexural vibrational stress modes about the plane of symmetry of the device (i.e., the center of the common contact) causes piezoelectric outputs of opposite polarity to those caused by longitudinal or radial stress modes thereby resulting in a low output.

Figure 2:
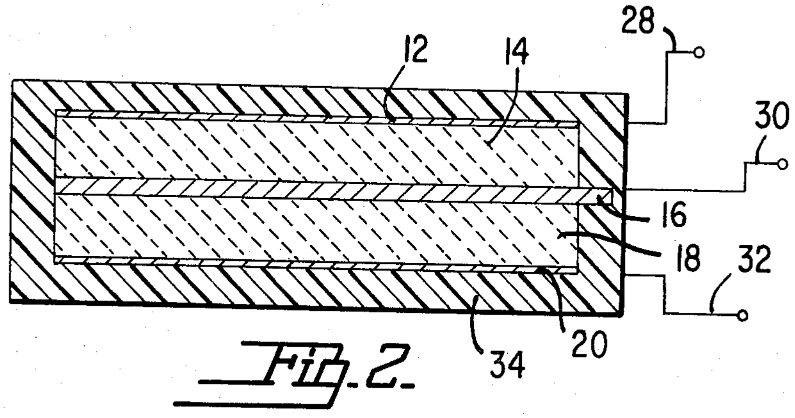
FIG. 2 is a side cross-sectional view of a potted adaptive ferroelectric transformer in accordance with the invention.

In FIG. 2 there is shown the same adaptive ferroelectric device as shown in FIG. 1 except encapsulated in a suitable substance 34 to enhance non-resonant response and reduce resonant response by helping to suppress resonant modes of mechanical vibrations. This encapsulation tends to preferentially reduce the flexural vibrations thereby resulting in a much higher gain as compared with the unmounted, unpotted structure shown in FIG. 1 and making this device useful as an adaptive transformer. Typically, gains of unencapsulated devices such as shown in FIG. 1 are <0.25 percent as compared to >3 percent gain for encapsulated devices. However, we have found that the encapsulants ability to properly restrict the flexural vibrations of the transformer structure is a function of temperature and leads to temperature variations of the gain characteristics of the device. In addition, the encapsulant also exerts extreme pressure on the transformer capacitors which can significantly alter the dielectric constant of the ferroelectric material to a lower or clamped value. The pressure results from the high shrinkage or thermal expansion coefficients of the encapsulant relative to that of the ferroelectric material.

We have discovered that high values of maximum gain of an adaptive ferroelectric transformer together with temperature stability can be achieved only if the non-resonant vibrations of the transformer structure are restricted to essentially one type or combination of types of vibrations that yield the same polarity output signals and where the means for restricting said vibrations is not significantly temperature sensitive. We have found that by surface mounting the ferroelectric transformer on a rigid substrate, non-resonant vibrations can be essentially limited to radial vibrations (as opposed to flexural vibrational modes) which yield the same polarity output signal and hence result in high gain, while at the same time significantly reducing temperature instability occurring in potted devices. In addition, the dielectric constant does not change significantly when the device is surface mounted. By a rigid substrate, it is meant that the substrate is essentially free of significant flexural movement. Alternatively, a structure is provided so that if substantial flexture occurs, it is about a plane which lies below the center of the mounted capacitors. Then the polarity of the net piezoelectric output due to the flexural components of stress and piezoelectric output due to the radial components of stress will be additive and gain will be high. Radial vibrations are those vibrations in a plane parallel to the surface of the device.

Figure 3:
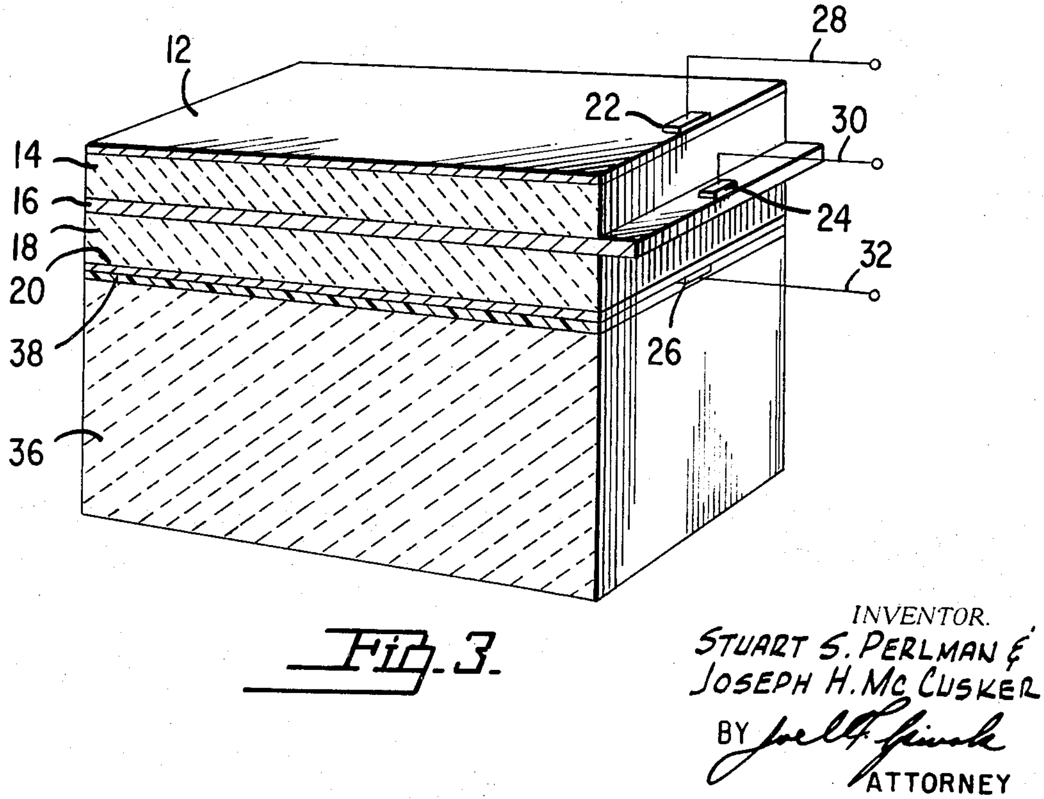
FIG. 3 is a perspective partially cross-sectional view of an adaptive ferroelectric transformer which is surface mounted in accordance with the invention.

A typical surface mounted device is shown in FIG. 3. The basic transformer structure, that is the mechanically coupled pair of ceramic capacitors, is the same as that shown in FIG. 1. Here, however, the second metal contact 20 is bonded to a rigid ceramic substrate 36 by a very thin (about 1 mil) layer 38 of an epoxy cement. A high temperature thermal setting epoxy is preferred in order to maintain a rigid bond between the substrate and the transformer over the entire operating temperature range of the device. A particularly useful cement is a single component epoxy casting compound available from Hysol Corporation, Olean, New York under No. A-74322. Only a thin layer of this cement is used in order to minimize any pressures exerted on the adaptive ferroelectric transformer structure by shrinkage of the epoxy during curing process. The substrate material must be rigid and thick enough such that the resultant structure will be difficult to excite into flexural vibration. The substrate material should also preferably be selected to have an expansion coefficient close to that of the transformer material. This will help to minimize temperature dependent pressures exerted on the transformer structure. Substrate materials such as Pyrex glass, fused quartz, sintered ceramics and brass are preferred. Typical substrate thicknesses are several times the thickness of the transformer. The thicker the substrate, the lower the magnitude of flexural vibration. Typically, the substrate thickness is at least three times the thickness of the transformer to substantially eliminate flexural vibrations. Another advantage of a thick substrate is to reduce the resonant frequency amplitude and to shift the resonant frequency of flexural vibrations to high values, thus extending the range of the device where a flat output response is obtained.

While materials such as epoxies are useful as substrates, they are not preferred because of their higher expansion coefficients and lower temperature stability as compared to the inorganic substrates mentioned above. An alternative means for mounting the transformer capacitor onto the substrate is by brazing. For example, a ceramic substrate may be provided with a molybdenum surface onto which nickel or copper may be plated and the capacitor then brazed.

Figure 5:
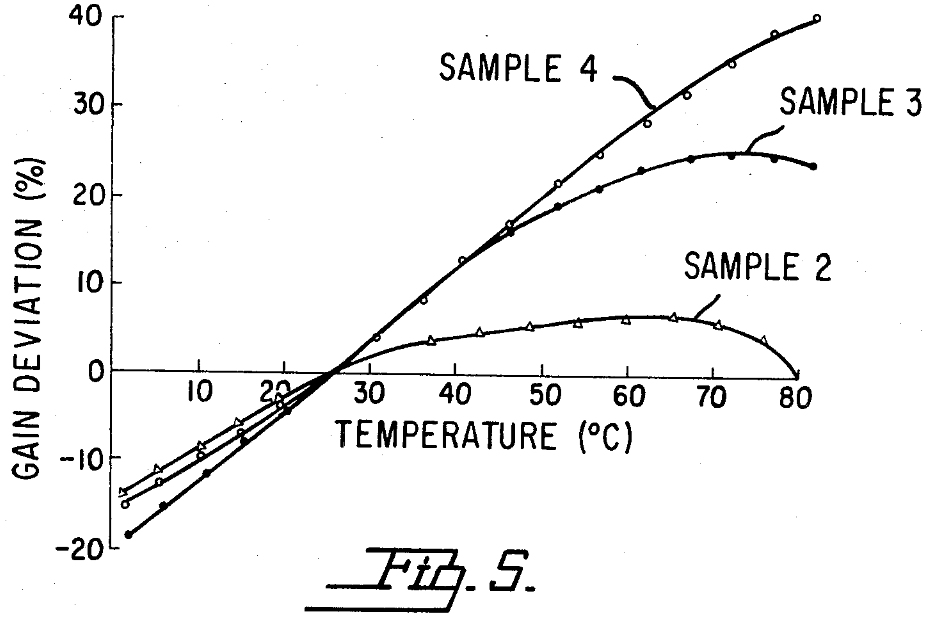
FIG. 5 is a graphical representation showing the gain stability characteristics as a function of temperature of potted adaptive ferroelectric transformers in different encapsulants.
Figure 6:
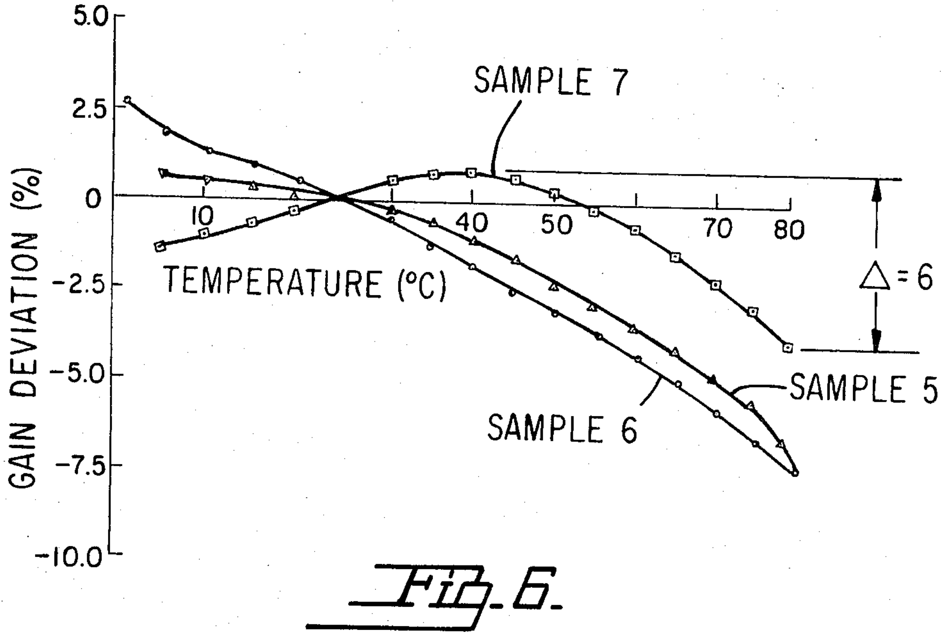
FIGS. 6 and 7 are graphical representations showing gain stability characteristics of similar adaptive ferroelectric transformers as a function of temperature of surface mounted structures on different substrates.
Figure 7:
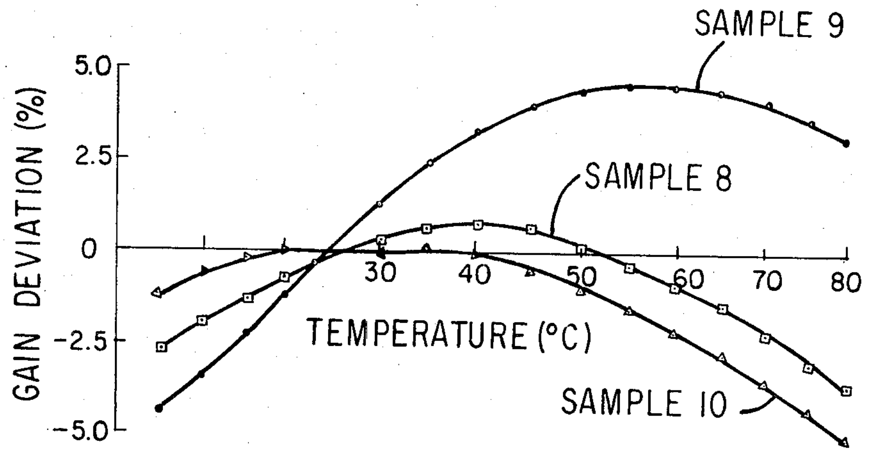

A comparison of the temperature stability of the gain characteristics, capacitance and maximum gain of unencapsulated, encapsulated and surface mounted transformers is presented in Table I and FIGS. 5 through 7.

FIG. 5 shows the percent change in gain of encapsulated transformers as the temperature is changed from room temperature. It can be seen with reference to the table that samples 2–4 shown in FIG. 5 employ different encapsulants. The deviation in gain is a function of the particular encapsulant. Deviations of from −15 to +40 percent are observed for sample 4, while the deviation for sample 2 is about −14 to +6 percent in the temperature range from 0°C to 80°C. The improved temperature stability achieved by surface mounting can be seen with reference to the curves for samples 5–10 in FIGS. 6 and 7. Here, over the same temperature range sample 9 has one of the largest deviations ranging from about −5 to +5 percent while the deviations of sample 10 are from about −4 to 0 percent. Consequently, surface mounting results in improved temperature stability.

TABLE I

A Comparison of AFT Characteristics of Devices Fabricated with Identical Transformer Structures But Different Mounting Techniques

| Sample | Description[a,b] | Maximum[c] Gain (%) | Mounted Side[d] ΔC (%) | Open Side[d] ΔC(%) | c,e Δ(%) |
|---|---|---|---|---|---|
| 1 | unencapsulated | 0.25 | 0 | 0 | — |
| 2 | encapsulated in A | 7.7 | −5 | −5 | 15 |
| 3 | encapsulated in B | 5.5 | −40 | −40 | 42 |
| 4 | encapsulated in C | 3.7 | −50 | −50 | 51 |
| 5 | surface mounted on Pyrex[f] | 4.6 | +10 | +2 | 8 |
| 6 | surface mounted on Fused Quartz[f] | 6.1 | +5 | +2 | 10 |
| 7 | surface mounted on Ceramic[g] | 6.3 | −4 | −5 | 6 |
| 8 | surface mounted on Brass[f] | 5.5 | −25 | −5 | 4 |
| 9 | surface mounted on C[f] | 6.8 | −25 | −5 | 9 |
| 10 | surface mounted on Ceramic + D[h] + B[i] | 6.0 | −5 | −2 | 5 |

NOTES FOR TABLE I:

A—Casting compound (resin XC9–C419) with hardener (H2–3561), available from Hysol Corporation, Olean, N.Y.

B—Casting compound (resin R8–2038) with hardener (H6–3615), available from Hysol Corporation, Olean, N.Y.

C—Casting compound single component A–74322, available from Hysol Corporation, Olean, N.Y.

D—Silicone resin—Sylgard 184, available from Dow Corning, Hemlock, Michigan.

a—All samples have identical rectangular transformer structure—250 mils × 250 mils by 20 mils thick. Capacitor thickness approximately 7 mils.

b—All samples have the same ceramic ferroelectric material—PZT5H available from Clevite Corporation, Bedford, Ohio. This ferroelectric material has a piezoelectric coupling coefficient (Kp) that is substantially flat over the temperature range considered.

c—When applicable, the mounted capacitor is taken as the output capacitor. The input equals a 1 volt rms sine wave at 5 kHz.

d—Capacitance measured after fabrication compared to the capacitance of an unencapsulated or unmounted transformer which is approximately 4800 pF.

e—Sum of the magnitudes of the maximum positive and negative gain deviations in the temperature range 5 to 80°C.

f— Rectangular substrate approximately 250 mils × 250 mils by 100 mils thick.

g—Ring shaped substrate approximately 320 mils O.D., 100 mils I.D. by 65 mils thick.

h—Conformal coating of D.

i—Device totally encapsulated in B after conformal coating of D.

It can be seen from the table that the temperature stability of the gain of surface mounted devices is superior compared to the encapsulated devices while still maintaining a high value of maximum gain. The gain values of surface mounted devices are shown to be stable within a few percent over the temperature range of 5° to 80°C. The capacitance values of surface mounted devices are generally higher than those of the encapsulated devices, being nearly equal to and in some cases greater than the capacitance of an unencapsulated device. The higher capacitance values correspond to the substrates with the lowest thermal expansion coefficients. As indicated by the table, a ceramic substrate for mounting the adaptive ferroelectric transformer is preferred in order to achieve the combination of high gain and good temperature stability as well as small deviations in capacitance. The particular gain versus temperature characteristic of the ferroelectric transformer is also dependent upon the ferroelectric material employed. Therefore, different temperature characteristics may be obtained upon selection of different ferroelectric materials in the capacitor.

Figure 4:
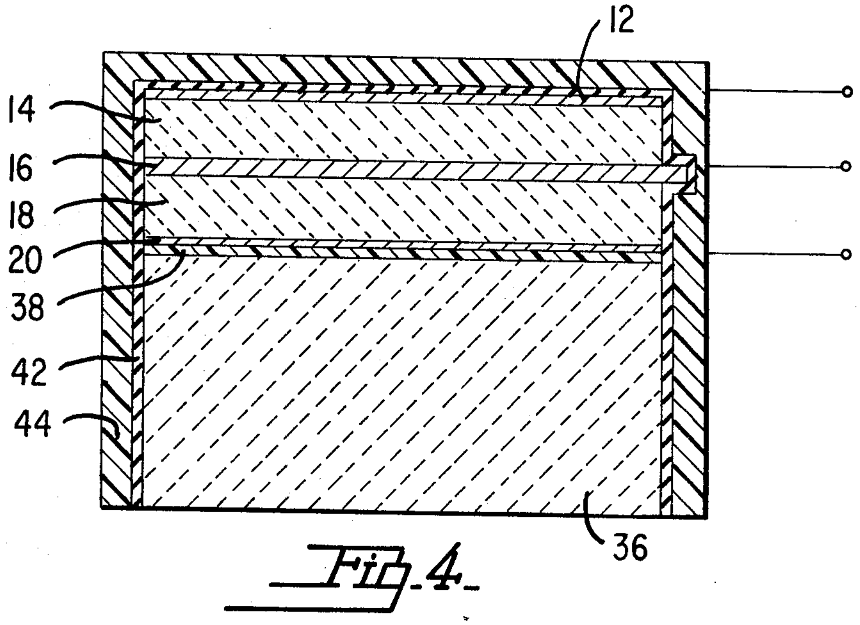
FIG. 4 is a side cross-sectional view of a surface mounted device which is also potted.

Sample 10 in the table refers to an adaptive ferroelectric transformer as shown in FIG. 4. In some instances, for structural or other reasons, potting of a surface mounted adaptive ferroelectric transformer may be desired. In the case of a surface mounted transformer, the encapsulant does not have to restrict flexural vibrations as in the case of encapsulated transformers which are not surface mounted. Consequently, the transformer structure can be protected from epoxy induced stresses by placing a conformal rubberized coating over the structure prior to its encapsulation. Although the coating may not totally absorb the stresses, the temperature characteristics of the resultant device will still be good. Referring to FIG. 4, there is shown the surface mounted device described with reference to FIG. 3. The device now includes, however, a rubberized coating 42 which is a few mils thick and which conforms to and covers the exposed surface of the surface mounted transformer. Encapsulant 44 is then provided over the coating 42 so as to encapsulate the ferroelectric transformer. As can be seen with reference to sample 10 in Table I and FIG. 7, the characteristic of this device is only slightly different from that of a comparable but unencapsulated surface mounted device.

What I claim is:

1. An adaptive electronic transformer structure comprising an input capacitor and an output capacitor adjacent each other, said capacitors being mechanically coupled piezoelectric capacitors and separated from each other by a thin electrode, at least one of said capacitors possessing ferroelectric properties, and mounting means coupled therewith for supressing resonant mechanical vibrations of said input capacitor while leaving essentially non-resonant vibrations with net components of mechanical stress in one direction, thereby creating a polarity output signal in the output capacitor.

2. The transformer structure recited in claim 1 wherein said means for suppressing mechanical vibrations is substantially temperature insensitive over the operating temperature of said device.

3. The transformer structure recited in claim 2 wherein the piezoelectric material of said capacitors has an essentially flat temperature response.

4. An adaptive electronic transformer structure comprising a pair of mechanically coupled piezoelectric capacitors adjacent each other and separated by a thin electrode, at least one of said capacitors possessing ferroelectric properties, and a rigid substrate means upon which one of said capacitors is surface mounted by a layer of epoxy cement in order of 1 mil thick, said rigid substrate being selected from the group consisting of glass, quartz, ceramic and brass, and the thickness of said substrate means being such that flexure of said structure occurs about a plane which lies below the middle of the mounted capacitor, whereby the polarity of the net output signal due to flexure is the same as that due to radial stress components.

5. An adaptive electronic transformer structure comprising a transformer comprised of a pair of mechanically coupled piezoelectric capacitors, at least one of which is also ferroelectric, a rigid substrate upon which said transformer is surface mounted by means of a thin layer of a cement, said surface mounting suppressing resonant vibrational modes in said transformer and limiting non-resonant vibrations to essentially those which yield the same net polarity output signal, a thin flexible coating over the exposed surfaces of said transformer and a thick encapsulant over said flexible coating.

* * * * *